3,577,441
NITRO SUBSTITUTED BENZOFURANS
Daniel Kaminsky, East Paterson, Robert I. Meltzer, Rockaway, and John Shavel, Jr., Mendham, N.J., assignors to Warner-Lambert Pharmaceutical Company, Morris Plains, N.J.
No Drawing. Filed Mar. 7, 1967, Ser. No. 621,156
Int. Cl. C07d 5/42, 5/44
U.S. Cl. 260—346.2                               3 Claims

ABSTRACT OF THE DISCLOSURE

A novel method for the production of substituted benzofurans by reacting an activated halo compound with an oxime in the presence of a suitable base to obtain an oxime ether. The oxime ether is then treated to yield the benzofuran nucleus.

---

The present invention relates to a novel method for the production of substituted benzofurans. The substituted benzofurans of this invention have the following structural formula:

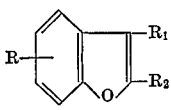

wherein R is nitro, dinitro, halogen, carboxylic ester, lower alkyl, lower alkoxy, acyl of a carboxylic acid, or trifluoromethyl; and $R_1$ is lower alkyl, hydrogen, aryl or substituted aryl; $R_2$ is lower alkyl, aryl, substituted aryl, carboxy lower alkyl, or acyl or $R_1$ and $R_2$ taken together form a part of a cyclic ring system such as for example:

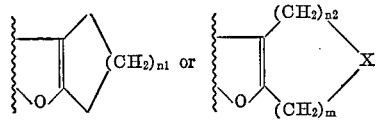

where $n_1 = 1,2,3,4,5,6$       where $n_2 = 1,2,3$
                                $m = 1,2,3$ in which X is oxygen, sulphur or $NR_3$ wherein $R_3$ is hydrogen, lower alkyl or acyl.

The above definition for lower alkyl and the alkyl portion of lower alkoxy is meant to include from 1 to 6 carbon atoms such as methyl, ethyl, propyl, isopropyl and the like. Aryl includes homocyclic ring systems such as phenyl as well as monoheterocyclic ring systems such as pyridyl, furyl and the like. In the definition for substituted aryl, the aryl portion has the same meaning as defined and it is nuclearly substituted with groups such as nitro, halogen, mercapto, lower alkyl, lower alkoxy and the like. Halogen includes all the four members i.e. bromine, fluorine, iodine and chlorine. Acyl is the residue of a carboxylic acid e.g. acetyl, benzoyl and the like.

The symbols R, $R_1$, $R_2$, and $R_3$ used hereinafter have the same meaning as defined.

The compounds of this invention exhibit antibacterial activity against gram positive bacteria, for example Staphylococcus and gram negative bacteria, for example E. coli. Accordingly, they are useful as antibacterial agents. In use the compounds of this invention may be combined with an inert pharmaceutical carrier such as talc, starch, vaseline and the like to form dosage forms suitable for topical applications. These topical dosage forms are generally formulated with the active ingredient being present from about 1 to about 10% by weight. These compounds may also be administered internally to combat systemic bacterial infections.

Additionally, the novel compounds of this invention are useful as intermediates for the production of compounds having known pharmaceutical utility. For example, the compounds of this invention having the formula:

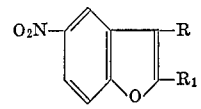

may be catalytically reduced to those compounds of the formula:

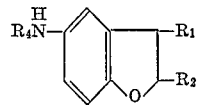

Compounds such as III in which $R_1$ is hydrogen and $R_2$ is methyl have been described in U.S. Pat. No. 3,252,999 as being useful as starting materials for the production of chemotherapeutically active compounds.

Compounds of type III, wherein $R_4$ is hydrogen, may be conveniently converted to any standard aniline derivative, such as ureas

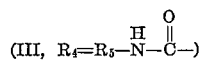

by reaction with isocyanates; to thioureas

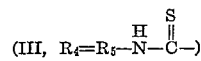

by reaction with isothiocyanates; to guanidines

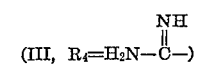

by reaction with metal cyanamides (such as calcium cyanamide, etc.); and diguanides

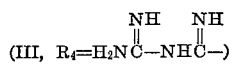

by reaction with dicyanodiamide (cyanoguanidine). These reactions may be found in any standard organic chemistry textbook, such as Fieser and Fieser, "Advanced Organic Chemistry." In the above $R_5$ is lower alkyl, aryl or aralkyl.

Novel benzofurans of this invention may be prepared according to the following scheme:

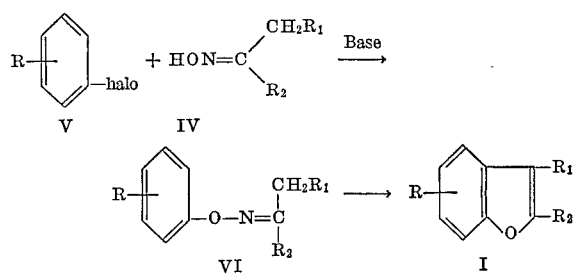

Referring now to the schematic diagram, the above reaction comprises treating a substituted oxime of a ketone, such as Formula IV, with an aromatic halide, such as that of Formula V above, in the presence of a suitable base such as sodium or potassium amide, sodium or potassium methoxide, alkali hydroxide and the like at temperatures from 0° to 120° C.

The resulting intermediate oxime ether VI may then be treated with an acid or may be heated to produce compounds of this invention. The aromatic halides V used in the process of our invention are known compounds which are available commercially. The oximes IV are prepared by reacting a suitable carbonyl compound with hydroxylamine according to the processes described by Shriner and Fuson "Identification of Organic Compounds," John Wiley & Sons, New York (Third Edition), or obtainable from commercial sources.

The following oxime ethers have been prepared embodying our novel process: (Exemplified by Examples 2 to 5.)

| | Melting point, °C. | Analysis, percent | | | | | |
|---|---|---|---|---|---|---|---|
| | | C | | H | | N | |
| | | Calc'd | Found | Calc'd | Found | Calc'd | Found |
| 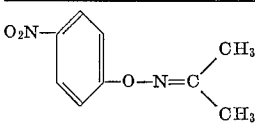 | 106–107 | 55.66 | 55.45 | 5.19 | 5.25 | 14.43 | 14.67 |
| 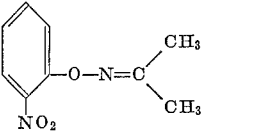 | 55–56 | 55.66 | 55.51 | 5.19 | 5.34 | 14.43 | 14.42 |
| 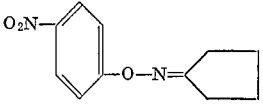 | 128–130 | 59.99 | 59.86 | 5.49 | 5.53 | 12.72 | 12.49 |
| 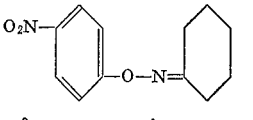 | 99–101 | 61.52 | 61.27 | 6.02 | 6.32 | 11.96 | 11.76 |
| 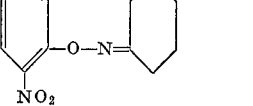 | 49–50 | 61.52 | 61.55 | 6.02 | 6.11 | 11.98 | 12.09 |
| 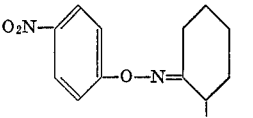 | 78–80 | 62.89 | 62.84 | 6.50 | 6.66 | 11.28 | 11.03 |
| 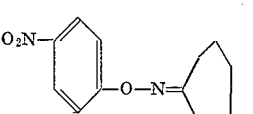 | 83–85 | 62.89 | 63.10 | 6.50 | 6.24 | 11.28 | 11.13 |
| 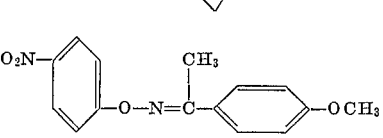 | 108–109 | 62.93 | 62.99 | 4.93 | 5.23 | 9.79 | 9.81 |
| 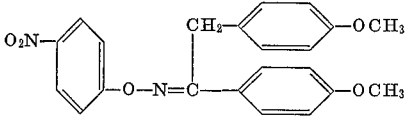 | 117–119 | 67.33 | 67.58 | 5.14 | 5.41 | 7.14 | 7.05 |
| 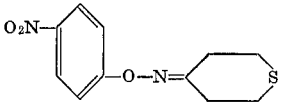 | 116–118 | 52.37 | 52.22 | 4.79 | 4.86 | 11.10 | 10.95 |
| 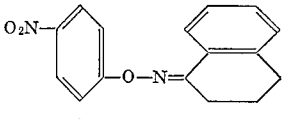 | 132–133 | 68.07 | 67.79 | 5.00 | 5.11 | 9.92 | 9.74 |
| 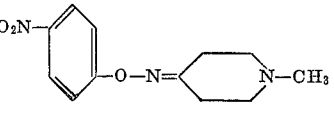 | 97–99 | 57.82 | 57.67 | 6.07 | 6.21 | 16.86 | 16.66 |

|   | Melting point, °C. | Analysis, percent | | | | | |
|---|---|---|---|---|---|---|---|
|   |   | C | | H | | N | |
|   |   | Calc'd | Found | Calc'd | Found | Calc'd | Found |
| O₂N–⟨phenyl⟩–O–N=⟨piperidine⟩–N–C(=O)–⟨phenyl⟩ | 170–172 | 63.71 | 63.97 | 5.05 | 5.19 | 12.38 | 12.14 |
| O₂N–⟨phenyl (NO₂)⟩–O–N=C(CH₃)(CH₃) | 88–89 | 45.19 | 45.23 | 3.79 | 3.84 | 17.57 | 17.69 |

The following benzofurans have been prepared by cyclization of the above oxime ether:

|   | Melting point, °C. | Analysis, percent | | | | | |
|---|---|---|---|---|---|---|---|
|   |   | C | | H | | N | |
|   |   | Calc'd | Found | Calc'd | Found | Calc'd | Found |
| (1) O₂N–⟨benzofuran⟩–CH₃ | 96–97 | 61.01 | 61.04 | 3.98 | 4.01 | 7.91 | 7.86 |
| (2) ⟨benzofuran-NO₂⟩–CH₃ | 100–102 | 61.01 | 61.11 | 3.98 | 4.14 | 7.91 | 7.76 |
| (3) O₂N–⟨dihydrobenzofuran fused cyclohexane⟩ | 146–148 | 66.35 | 66.52 | 5.10 | 5.11 | 6.45 | 6.25 |
| (4) ⟨dihydrobenzofuran fused cyclohexane, NO₂⟩ | 102–103 | 66.35 | 66.43 | 5.10 | 5.30 | 6.45 | 6.52 |
| (5) O₂N–⟨dihydrobenzofuran fused cyclohexane-CH₃⟩ | 99–101 | 67.52 | 67.75 | 5.67 | 5.74 | 6.06 | 5.98 |
| (6) O₂N–⟨benzofuran fused cycloheptane⟩ | 109–111 | 67.52 | 67.71 | 5.67 | 5.76 | 6.06 | 5.85 |
| (7) O₂N–⟨benzofuran⟩–⟨C₆H₄–OCH₃⟩ | 184–185 | 66.91 | 66.98 | 4.12 | 4.20 | 5.20 | 5.38 |
| (8) O₂N–⟨benzofuran⟩(⟨C₆H₄–OCH₃⟩)(⟨C₆H₄–OCH₃⟩) | 164–166 | 70.39 | 70.28 | 4.57 | 4.57 | 3.73 | 3.84 |
| (9) O₂N–⟨benzofuran fused thiophene⟩ | 209–211 | 56.16 | 56.13 | 3.86 | 3.99 | 5.95 | 5.73 |

| | Analysis, percent | | | | | |
|---|---|---|---|---|---|---|
| Melting point, °C. | C | | H | | N | |
| | Calc'd | Found | Calc'd | Found | Calc'd | Found |
| 149–150 | 72.44 | 72.70 | 4.18 | 4.21 | 5.28 | 5.40 |

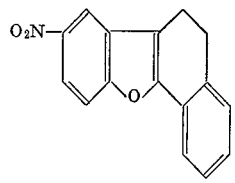

The following examples are included in order further to illustrate the invention. All temperatures are in degrees centigrade.

EXAMPLE 1

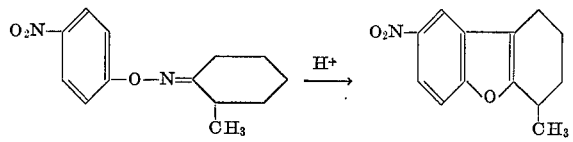

1 - methyl - 6 - nitro-1,2,3,4-tetrahydrodibenzofuran

A solution of 3.4 g. (0.0137 mol) of 2-methylcyclohexanone, O-(p-nitrophenyl) oxime, 50 ml. of absolute ethanol and 3 ml. of conc. hydrochloric was refluxed for 3 hours. The mixture was cooled, diluted with 200 ml. of water and filtered to yield 2.9 g. (92% of theory) of greenish yellow solid, M.P. 94–97° C. Recrystallization from petroleum ether gave the analytical material, M.P. 99–101° C.

Analysis.—Calcd. for $C_{13}H_{13}NO_3$ (percent): C, 67.52; H, 5.67; N, 6.06. Found (percent): C, 67.75; H, 5.74; N, 5.98.

The benzofurans 1 to 4 and 6 to 10 above are prepared by this procedure.

EXAMPLE 2

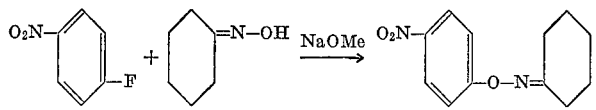

O-(p-nitrophenyl)-cyclohexanone oxime

A mixture of 113 g. (1.0 mol) of cyclohexanone oxime, 54 g. (1.0 mol) of sodium methoxide and 250 ml. of methanol was stirred for ½ hour and 500 ml. of dry dioxane added. Approximately 400 ml. of solvent was distilled off at ca. 10–15 mm. pressure. After an additional 500 ml. of dry dioxane was added, 141 g. (1.0 mol) of 4-fluoronitrobenzene was added slowly with stirring over ½ hour. The mixture was refluxed for 6 hours. Five ml. of acetic acid was added and the cooled mixture filtered from inorganic salts. The filtrate was stripped of solvents to yield about 250 g. of a brownish residue. Recrystallization from petroleum ether resulted in a yield of 204 g. of light yellow crystals, M.P. 92–96 (87% of theory). The analytical sample was prepared by repeated recrystallizations from petroleum ether, M.P. 99–101°.

Analysis.—Calcd. for $C_{12}H_{14}N_2O_3$ (percent): C, 61.52; H, 6.02; N, 11.96. Found (percent): C, 61.27; H, 6.32; N, 11.76.

EXAMPLE 3

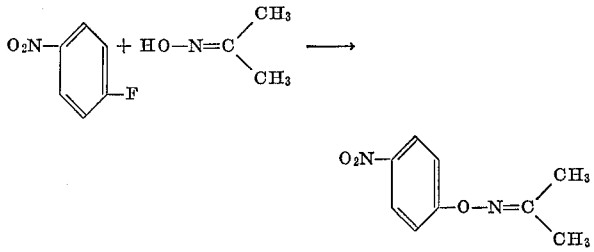

O-(p-nitrophenyl)-acetone oxime

A mixture of 36.5 g. (0.5 mol) of acetone oxime, 18.7 g. (0.48 mol) of solid sodium amide and 500 ml. of dry tetrahydrofuran was refluxed for 2 hrs. The mixture was cooled to room temperature and 63.5 g. (0.45 mol) of 4-fluoronitrobenzeen was added. This mixture was refluxed, with stirring, for 8 hours. The mixture was cooled and filtered from insoluble inorganics. The filtrate was then freed of solvent at ca. 10–15 mm. pressure. Trituration of the residue with cold 90% aqueous methanol, filtration and drying resulted in an 81% yield (71 g.) of light yellow solid, M.P. 96–102°. Recrystallization from aq. methanol or petroleum ether gave the analytical sample, M.P. 106–107°.

Analysis.—Calcd. for $C_9H_{10}N_2O_3$ (percent): C, 55.66; H, 5.19; N, 14.43. Found (percent): C, 55.45; H, 5.25; N, 14.67.

EXAMPLE 4

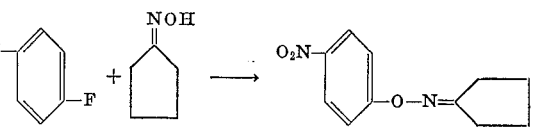

Cyclopentanone, O-(p-nitrophenyl)oxime

A mixture of 40 g. (0.4 mol) of cyclopentanone oxime, 26 g. (0.4 mol—based upon 87% active) of potassium hydroxide and 300 ml. of 95% ethanol was stirred for 1 hour and 56.4 g. (0.4 mol) of p-fluoronitrobenzene in 100 ml. of 95% ethanol was added. The deep purple solution was refluxed with stiring for 4 hrs. and allowed to crystallize overnight. Filtration yielded ca. 40 g. of tan crystals. Recrystallization from petroleum ether (B.P. 60–90°) resulted in a 34% yield (29.8 g.) of product, M.P. 123–128° C. The analytical sample was obtained by recrystallization from petroleum ether, faint tan crystals, M.P. 128–130° C.

Analysis.—Calcd. for $C_{11}H_{12}N_2O_3$ (percent): C, 59.99; H, 5.49; N, 12.72. Found (percent): C, 59.86; H, 5.53; N, 12.49.

EXAMPLE 5

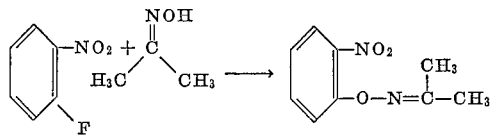

O-(o-nitrophenyl)-acetone oxime

A mixture of 40.2 g. (0.55 mol) of acetone oxime, 20.2 g. (0.52 mol) of sodium amide powder and 500 ml. of dry tetrahydrofuran was stirred for ½ hour and refluxed for 3 hours to complete evolution of $NH_3$. To the mixture was added, 71 g. (0.5 mol) o-fluoronitrobenzene and refluxing continued for 48 hours. The solvent was removed on a steam bath and the residue extracted with boiling Skelly B. Cooling yielded 79.3 g. (82%) of orange yellow crystals, M.P. 48–52°. The analytical sample was obtained by recrystallization from aq. ethanol, M.P. 55–56° C.

*Analysis.*—Calcd. for $C_9H_{10}N_2O_3$ (percent): C, 55.66; H, 5.19; N, 14.43. Found (percent): C, 55.51; H, 5.34; N, 14.42.

It is understood that the foregoing detailed description is given merely by way of illustration and that many variations may be made therein without departing from the spirit of our invention.

Having described our invention, what we desire to secure by Letters Patent is:

1. The compound of the formula:

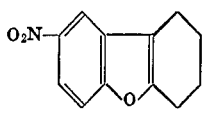

2. The compound of the formula:

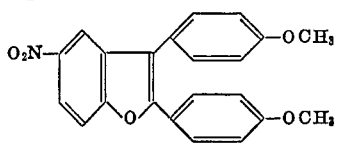

3. The compound of the formula:

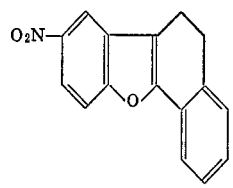

References Cited

UNITED STATES PATENTS

| | | | |
|---|---|---|---|
| 3,320,286 | 5/1967 | Filipasic | 260—346.2 |
| 3,452,033 | 6/1969 | Mooradian | 260—346 |

ALEX MAZEL, Primary Examiner

B. I. BENTZ, Assistant Examiner

U.S. Cl. X.R.

260—239, 294.7, 326.5, 327, 566; 424—244, 267, 275, 285